(12) United States Patent
Lin et al.

(10) Patent No.: US 8,286,782 B2
(45) Date of Patent: Oct. 16, 2012

(54) INFORMATION DISPLAY SYSTEM FOR PASSENGER CONVEYING DEVICE

(75) Inventors: Jia-Xing Lin, Hsinchu County (TW); Tai-Ann Chen, Taipei County (TW); Da-Wei Lee, Taipei (TW); Jung-Ya Hsieh, Taichung (TW)

(73) Assignee: Industrial Technology Research Institute, Chutung, Hsinchu (TW)

(*) Notice: Subject to any disclaimer, the term of this patent is extended or adjusted under 35 U.S.C. 154(b) by 310 days.

(21) Appl. No.: 12/272,112

(22) Filed: Nov. 17, 2008

(65) Prior Publication Data
US 2010/0122890 A1    May 20, 2010

(51) Int. Cl.
*B65G 17/00* (2006.01)
(52) U.S. Cl. ............... 198/502.1; 198/321; 198/337; 40/502
(58) Field of Classification Search .......... 198/321, 198/335, 337; 40/502, 512, 524; 187/391; 362/146
See application file for complete search history.

(56) References Cited

U.S. PATENT DOCUMENTS

| | | | | |
|---|---|---|---|---|
| 3,057,991 A * | 10/1962 | Grenadier | ...... | 362/146 |
| 3,131,871 A * | 5/1964 | Foulds | ...... | 362/146 |
| 5,339,228 A * | 8/1994 | Baethge et al. | ...... | 362/146 |
| 5,511,647 A * | 4/1996 | Adrian et al. | ...... | 198/335 |
| 5,613,758 A * | 3/1997 | Kamschal et al. | ...... | 362/576 |
| 5,959,763 A * | 9/1999 | Bozler et al. | ...... | 359/290 |
| 6,129,442 A * | 10/2000 | Hoefling et al. | ...... | 362/146 |
| 6,848,805 B2 * | 2/2005 | Pietz | ...... | 362/146 |
| 6,866,125 B2 * | 3/2005 | Ball et al. | ...... | 187/391 |
| 7,108,393 B2 * | 9/2006 | Kleewein et al. | ...... | 362/146 |
| 7,246,559 B2 * | 7/2007 | Stromberg | ...... | 104/124 |
| 7,951,254 B2 * | 5/2011 | Ball et al. | ...... | 156/247 |
| 2009/0067162 A1 * | 3/2009 | Vogt et al. | | |

* cited by examiner

*Primary Examiner* — Douglas Hess
(74) *Attorney, Agent, or Firm* — Alston & Bird LLP (57) ABSTRACT

An information display system for a conveying device, the information display system comprising a driving mechanism, a flexible display loop driven by the driving mechanism to travel in a closed loop, and an image forming module configured to provide media to at least a section of the flexible display loop.

30 Claims, 6 Drawing Sheets

INFORMATION DISPLAY SYSTEM FOR PASSENGER CONVEYING DEVICE

BACKGROUND OF THE INVENTION

The present invention relates to an information display system, and more particularly, to an information display system for a passenger conveying device.

Generally, escalators are used to transport people between different stories in shopping malls or department stores where various products are sold, or subways, airports, terminals and the like, to which people flock. Horizontal traveling type of escalators, such as moving walkways, may also be used in the same story in order to reduce traffic.

Since escalators are capable of transporting a multitude of people, it is possible to maximize the advertising effectiveness for products and corporations by providing advertising copies to the escalators. Typically, there are small advertising boards erected at transferring areas between successive escalators, as the advertising copies. A printed layer of advertising object may also be attached on handrails of an escalator to attract people's attention for the advertising object.

In U.S. Pat. No. 5,511,647, Adrian et al. describe an illuminated information display which has a light source provided within an escalator balustrade. Also, U.S. Pat. No. 6,866,125 to Ball et al. discloses an illumination system for escalator handrails. The illumination system includes light sources mounted onto or within the handrails to ensure display of advertising information or graphic designs to users of the escalator. While it is known to position lighting or illumination means under the handrails or in the base of the balustrade to increase aesthetic appeal of the escalator, some illumination systems or illuminated information displays available may require complex, expensive electronics and constant power in the escalators.

Thus, there remains a need for an information display system for escalators or other passenger conveying devices through which advertising information or messages may be efficiently broadcasted or displayed to the public in an economical way.

BRIEF SUMMARY OF THE INVENTION

An aspect of the present invention is to provide an information display system for a conveying device, the information display system comprising a driving mechanism, a flexible display loop driven by the driving mechanism to travel in a closed loop, and an image forming module configured to provide media to at least a section of the flexible display loop.

Another aspect of the present invention is to provide a conveying device comprising a conveyer belt, a panel disposed at a region surrounded by the conveyer belt, and an information display system configured to display information on the panel, the information display system comprising a driving mechanism, a flexible display loop driven by the driving mechanism to travel in a closed loop on the panel, and an image forming module configured to provide information to at least a section of the flexible display loop.

Still another aspect of the present invention is to provide an escalator system comprising a step belt including a plurality of steps, a panel disposed at a region defined by the step belt, a handrail loop around the panel, and an information display system comprising a driving mechanism, a flexible display loop driven by the driving mechanism to travel in a closed loop, and an image forming module configured to provide information to at least a section of the flexible display loop.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like parts.

The present invention provides an information display system for passenger conveying devices, such as escalators or moving walkways in public areas. The information display system provides an advertising means for presenting or displaying images or information for people in the public areas. The information display system may include a display driving mechanism, a flexible display loop traveling in a closed loop about the display driving mechanism and an image forming module that contacts with at least a section of the flexible display loop. The display driving mechanism, such as drive rollers, reciprocating drive arms or any other scrolling means, may be provided to drive the movement of the flexible display loop past the image forming module. The display driving mechanism may be linked to a main driving mechanism of a passenger conveying device, such that the flexible display loop may move relative to a handrail loop of the passenger conveying device. Examples of the invention also provide an information display system having the flexible display loop driven by the main driving mechanism of the passenger conveying device. Alternatively, the handrail loop may also be driven by the same driving mechanism that drives the movement of the flexible display loop. Accordingly, the flexible display loop may move co-axially with the handrail loop of the passenger conveying device. The flexible display loop may be driven by the display driving mechanism and moves in a direction relative to the passenger conveying device. Therefore, the flexible display loop may also be built as a part of the handrail loop or provided as a separate loop in the passenger conveying device.

As one example of the invention, the flexible display loop may be disposed over a side panel of the passenger conveying device. In another example, the flexible display loop may be disposed on the handrail loop of the passenger conveying device. The handrail loop may be a transparent handrail loop which allows advertising images or texts displayed underneath the handrail loop to be visible to the users of the passenger conveying device. Therefore, in accordance with a further example, the flexible display loop may also be disposed below the handrail loop. The flexible display loop provides media on which the image or text may be written by the image forming module. According to examples of the invention, the flexible display loop includes but is not limited to bistable display material, electrophoretic display material, cholesteric liquid crystal material, or a combination thereof.

Figure 1:
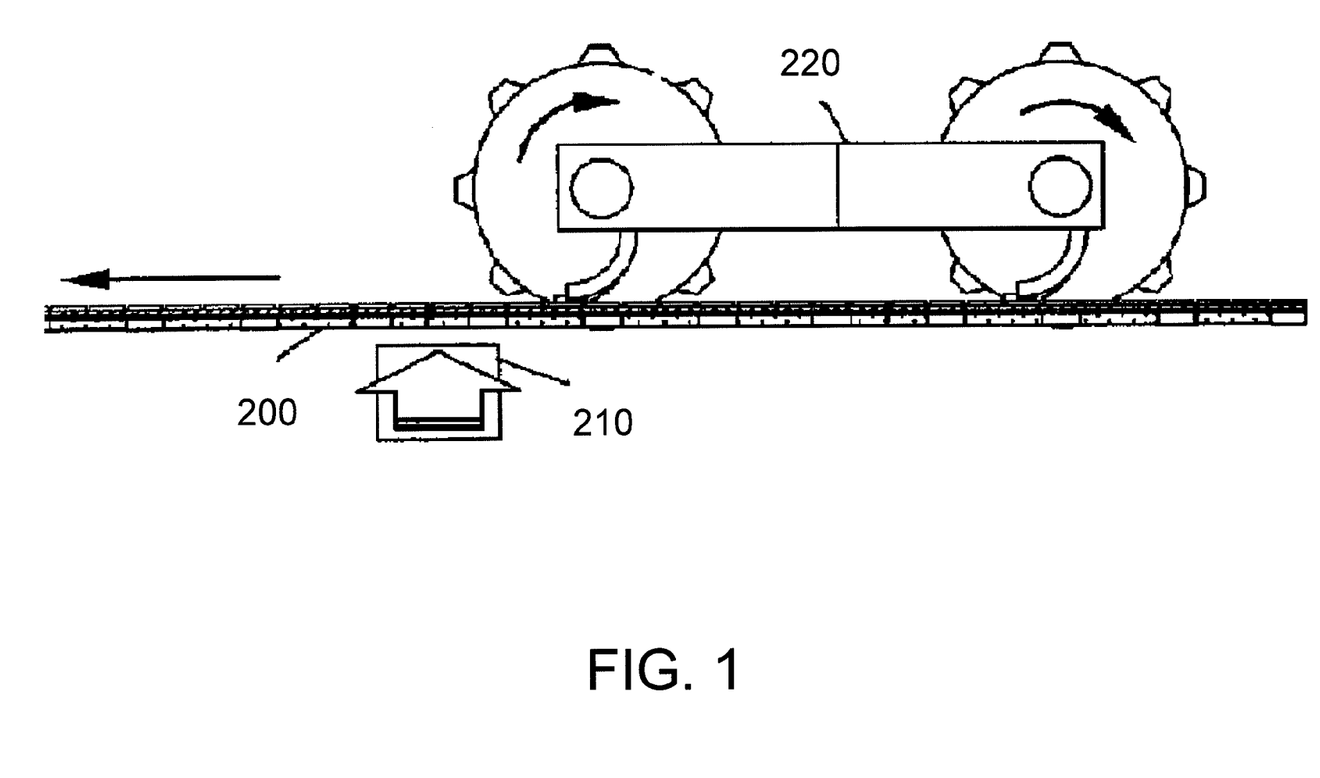
FIG. 1 is a cross-sectional view of an image forming module in accordance with one embodiment of the present invention.

Referring to FIG. 1, the image forming module may include at least one writehead 220 arranged substantially adjacent to the flexible display loop 200 to write or re-write images or texts continuously on a section of the flexible display loop 200 that moves past the writehead 220. As shown in FIG. 1, the location or alignment of the writehead 220 relative to the flexible display loop 200 may be accomplished through use of an optical scanner 210. The optical scanner 210 may be programmed to observe optical features on the flexible display loop 200, and send a signal to the writehead 220 when it is time to write. The optical scanner 210 may be located on the view side of the flexible display loop 200 downstream from the writehead electrode such that it can be used to check the optical state of each column pixels as they pass. This enables the verification that the correct image is written on the pixels, and can be used to initiate the corrective action if a problem develops. However, the alignment between the write electrode and the flexible display loop can also be accomplished by many other ways known to those skilled in the art.

The writehead may be mounted within the display driving mechanism or disposed as a separate unit outside the display driving mechanism. According to one example of the invention, the writehead may be set immobile with respect to the flexible display loop. The image forming module may also include a plurality of writeheads arranged to write or re-write different groups of images or texts on sections of the flexible display loop, such that the desired information or advertisement made up of groups of images or texts may be broadcasted to the public. As another example, the writeheads may be set to move with respect to the flexible display loop. The writeheads may be set to move along with the handrail loop of the escalator. And depending on the advertising effect desired, both the writeheads and the flexible display loop may move in opposite directions, at the same or different speeds. The image forming module may be powered by connecting directly to a power source, such as a battery or an electrical circuit, or through some secondary connections, such as wires.

The image forming module may further include a controller chip or controller circuit board coupled to the writehead or writeheads. As one example of the invention, the controller chip may be configured or programmed to bring the writeheads into contact with sections of the flexible display loop when the texts or images are written or re-written on the flexible display loop. Specifically, the electrodes of the writeheads make electrical contacts with the conductive areas of the flexible display loop, such that electrical signals can be applied via the writeheads to define images on the flexible display loop. The displayed image or text may be formed on an inner side the flexible display loop, an outer side of the flexible display loop, or both sides if double-sided display material is used. According to other examples of the invention, the writeheads may also be arranged to conduct light to a section of the flexible display loop with use of a photoconductor. The writehead may comprise a light source associated with photoconductor and selectively operable to switch the photoconductor between a conductive and a non-conductive state. The light source may be an electroluminescent material. Alternatively, the writehead may comprise a light source associated with the photoconductor and a light valve disposed between the light source and the photoconductor and arranged to control transmission of light from the light source to the photoconductor. Any suitable light valve may be used, including light valves operated by use of polymer-dispersed liquid crystal (PDLC), suspended particle and electrochromicity. Specifically, the writehead may include one dimensional charge coupled device (1-D CCD) sensor and spot light source such as light emitting diode (LED) and laser diode arranged in a manner similar to CCD module in the photocopier or scanner to write information or displayed data on the flexible display loop dependable on the light strength.

Data may be supplied to the information display system from a computer in wired or wireless communication with the writehead. For example, data may be transmitted via Universal Serial Bus (USB) cable connections from a laptop computer or portable handheld device to a receiver module in the information display system. The data may be processed and directed to the image forming module, which in turn writes the desired texts or images on a section or sections of the flexible display loop. Other examples may involve transmitting data via infra red or radio frequency signals from a computing unit to the image forming module in the information display system. Refreshing of the images in the information display system may occur periodically, wherein the updated texts or images are written to the flexible display loop when the writeheads make contacts to sections of the flexible display loop. The update process may be terminated by ceasing the signal transmission to the image forming module. The image forming module may also be separated from the flexible display loop once the update process is complete. In accordance with other examples of the invention, the information display system may further include sensors or detectors which send an actuation signal to drive the display driving mechanism only when a user approaching or stepping into the escalator is detected by the sensors or detectors, otherwise the display driving mechanism may be set at an OFF state to save energy. The sensors or detectors may be coupled directly to the display driving mechanism or via other units of the information display system or passenger conveying device.

The present invention also provides a passenger conveying device which includes a conveyer belt, a side panel disposed on a lateral side of the conveyer belt, and an information display system mounted over the side panel. In the information display system, the flexible display loop may travel in a closed loop about the display driving mechanism which may be linked or unlinked to the main driving mechanism of the passenger conveying device. According to examples of the invention, the display driving mechanism, flexible display loop and image forming module may be integrated as parts of the passenger conveying device or included as accessory or auxiliary structures without modifying the operation of the passenger conveying device. The passenger conveying device of the invention may include but not be limited to escalators, moving walkways, automated transport devices and vehicle as long as the passenger conveying device incorporates or operates concordantly with the information display system of the invention.

According to one example of the passenger conveying device, the flexible display loop may be disposed over the side panel. In another example, the passenger conveying device further includes a handrail loop disposed on top of the side panel in such a way that the flexible display loop may be on top of the handrail loop. Other examples of the passenger conveying device also provide a transparent handrail loop over the flexible display loop. Hence, advertising images or texts displayed underneath the transparent handrail loop may be visible to the users of the passenger conveying device. Depending on the advertising effects desired, the flexible display loop may be set stationary or immobile relative to the handrail loop which moves in one predefined direction. As a result, the displayed advertisement may approach and move right into the view of user standing on the step of the passenger conveying device like a scrolling marquee, allowing the user to read the displayed advertisement over the entire stretch of the flexible display loop. And the flexible display loop may be driven to move in a same direction as the conveyer belt, such that the displayed advertisement may seem relatively stationary to the users. Therefore, the user may be given sufficient time to read over more complex advertising information. Also, the flexible display loop may move in an opposite direction from the conveyer belt. By such movement, the displayed advertisement may move into the user's view like a scrolling marquee and ensures the user to read the displayed advertisement over a stretch of the flexible display loop. Accordingly, the image forming module may include a single writehead or a plurality of writeheads arranged to contact with the stretch of the flexible display loop viewable by the user.

The present invention further provides an escalator system, which includes a step belt consisting of a plurality of steps, a side panel disposed on a lateral side of the step belt, a handrail loop disposed on top of the side panel, and an information display system disposed substantially adjacent to the side panel. It is further noted the escalator system may not be limited to the basic escalator assembly described above. Other escalator assemblies that include the above-described information display system may also be encompassed by the scope of the invention. The flexible display loop may either be disposed over the side panel, on the handrail loop or below the handrail loop. As one example, the flexible display loop may be disposed vertically on top of the side panel. According to one other example, the flexible display loop may also be disposed laterally to parallel with the side panel so as to ensure that the advertising information is projected or displayed on the side panel. Specifically, the side panel may be a reflective or opaque surface to reflect the projected advertising information from the flexible display loop. As a result, the advertising effect may also be achieved through both the flexible display loop and side panel. Also, the flexible display loop may be driven to move in a same direction as the handrail loop or move in an opposite direction from the handrail loop.

The operation of the information display system relative to the escalator system may be understood with reference to certain embodiments, as depicted in the Figures and described below.

Figure 2:
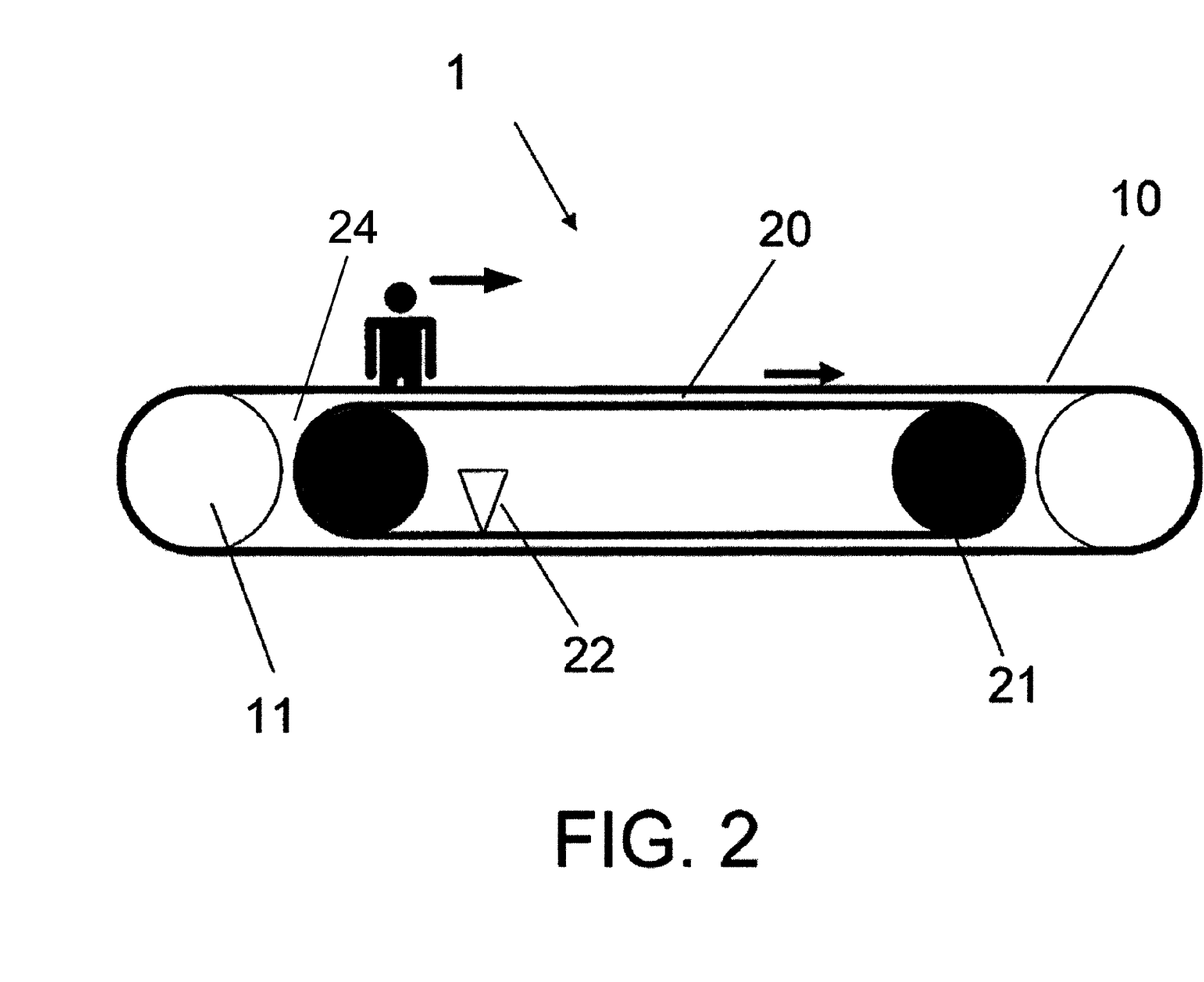
FIG. 2 is a cross-sectional view of an escalator system in accordance with a first embodiment of the present invention.

FIG. 2 is a cross-sectional view of an escalator system 1 in accordance with a first embodiment of the present invention. As illustrated in FIG. 2, the escalator system 1 of the first embodiment may be provided with an information display system, an escalator handrail 10 and a main driving mechanism 11. The information display system may include a flexible display loop 20 disposed on a pair of rollers 21 and a writehead 22 that contacts with a section of the flexible display loop 20. In one example, the flexible loop may be disposed over a side panel 24. In another example, the flexible display loop may be disposed on the handrail. When advertising materials such as texts or images are to be written to the flexible display loop 20, the flexible display loop 20 may be set stationary with respect to the escalator system 1 while the writehead 22 may be controlled to move and contact with at least a section of the flexible display loop 20. Accordingly, the texts or images written may be displayed on the section of the flexible display loop 20 that makes the contact with the writehead 22. The escalator handrail 10 may be driven by the main driving mechanism 11 to move in one direction, for example, from left to right as indicated by an arrow. When a user stands on the step or steps of the escalator system 1 and travels in the same direction as the escalator handrail 10, he/she would be able to view the advertisement displayed in the section of flexible display loop 20 moving towards him or her like a scrolling marquee. Therefore, the user may be able to view the displayed advertisement in a stretch of the flexible display loop 20.

Figure 3:
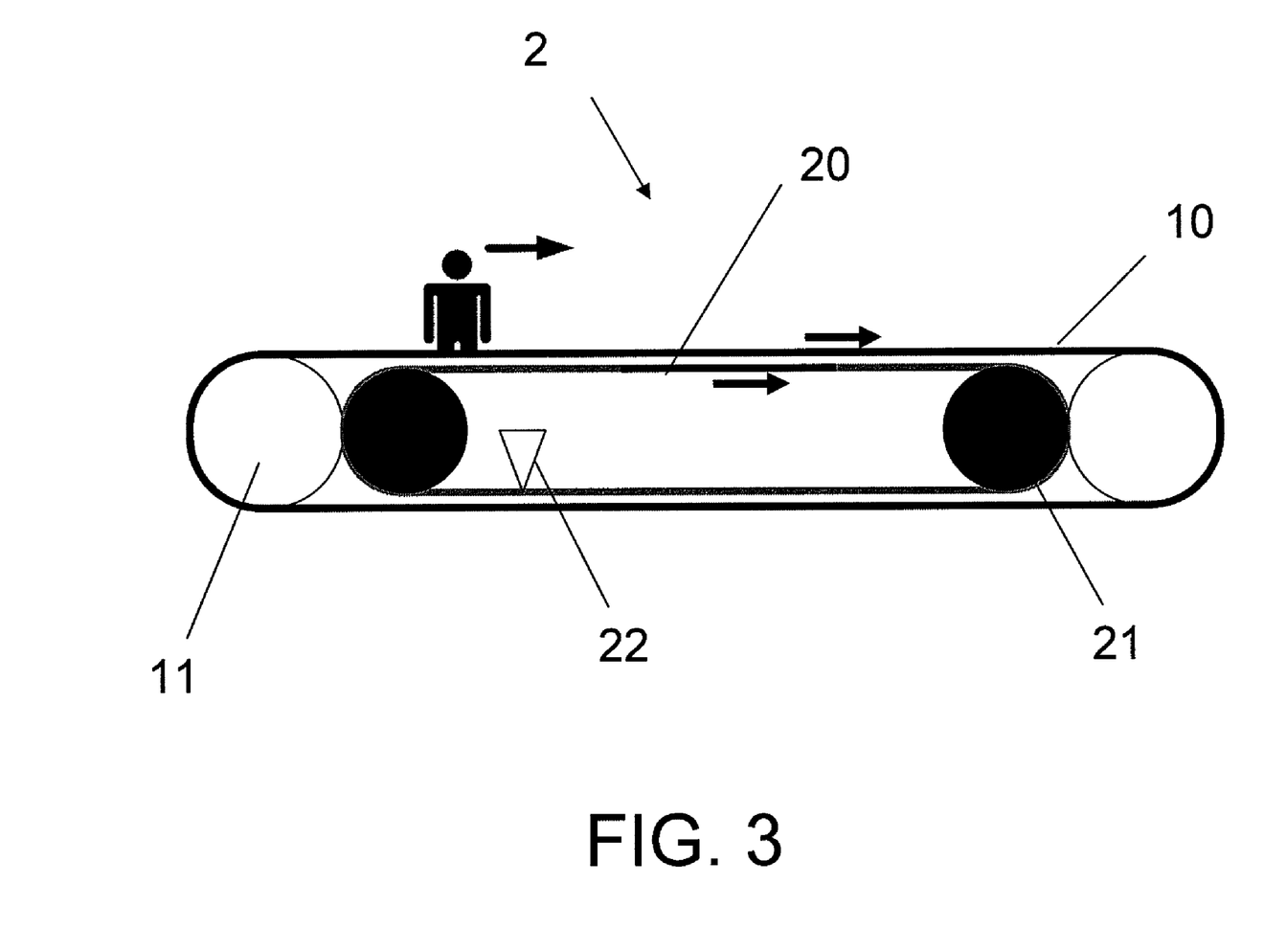
FIG. 3 is a cross-sectional view of an escalator system in accordance with a second embodiment of the present invention.

FIG. 3 is a cross-sectional view of an escalator system 2 in accordance with a second embodiment of the present invention. Referring to FIG. 3, the escalator system 2 of the second embodiment may be provided with an information display system with the flexible display loop 20 moving in the same direction as the escalator handrail 10. Depending on the display speed desired, the flexible display loop 20 may be set to move at the same speed with or different speed from the movement of the escalator handrail 10. When the flexible display loop 20 moves at the same speed with the escalator handrail 10, the advertisement displayed in the flexible display loop 20 may seem relatively stationary to the user. Hence, the user may be given sufficient time to read over the advertisement when standing or moving on the step or steps of the escalator system 2. This is particularly useful when a complex advertising message need to be broadcasted to the user. Other examples may also involve setting the flexible display loop 20 to move relative faster or slower than the movement of the escalator handrail 10, such that the advertisement may be displayed like a scrolling marquee to the user.

Figure 4:
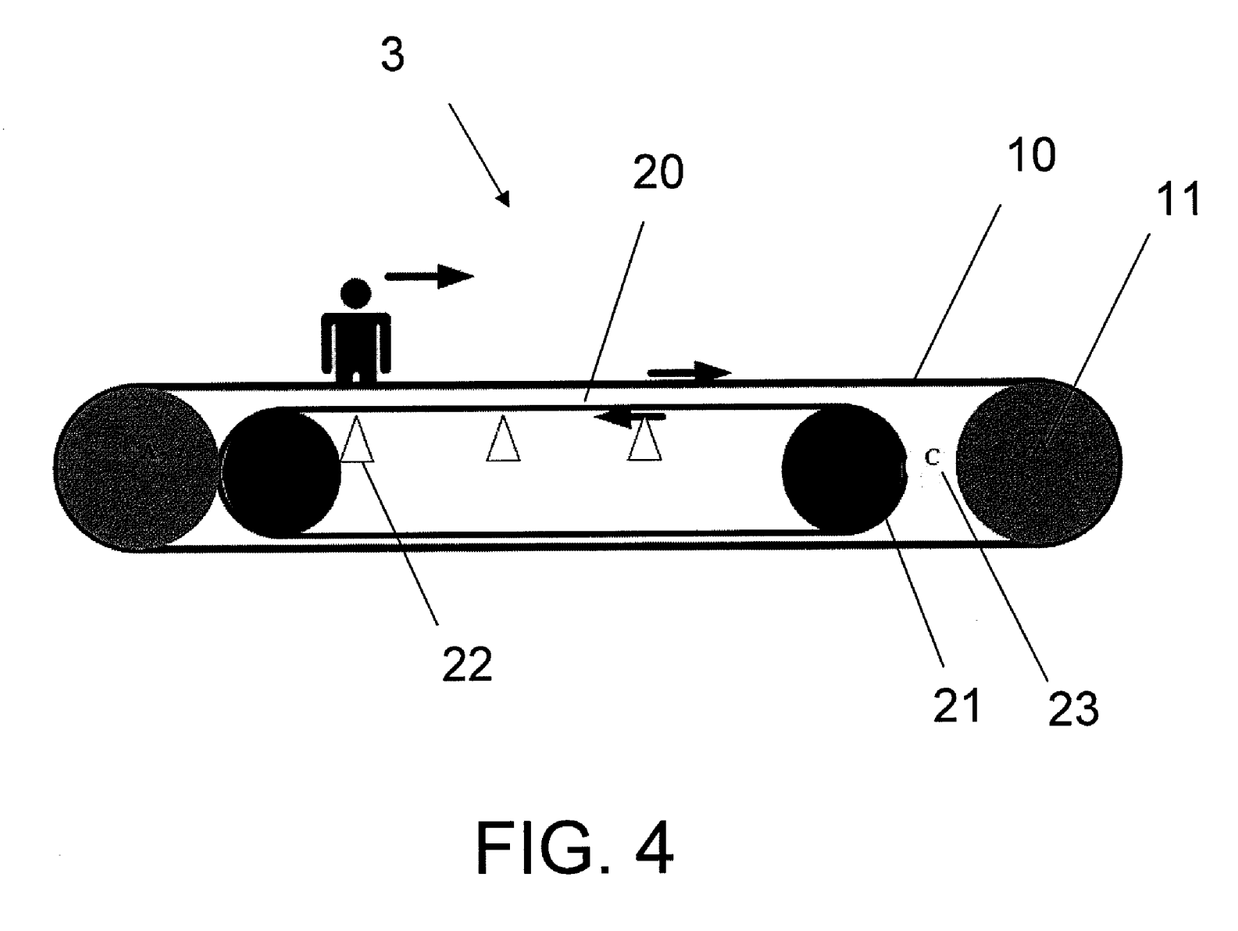
FIG. 4 is a cross-sectional view of an escalator system in accordance with a third embodiment of the present invention.

FIG. 4 illustrates an escalator system 3 according to a third embodiment of the invention. As shown in FIG. 4, the user standing on the step of the escalator system 3 may be carried forward in one direction, for example, from left to right as indicated by an arrow. The escalator handrail 10 may be driven by the main driving mechanism 11 to move in the same direction. The main driving mechanism 11 may be linked via gears or clutches to transmit the moment of inertia to the display driving mechanism 21, and vice versa. The main driving mechanism 11 in one example may be linked via a linking mechanism 23 such as a roller to the display driving mechanism 21 of the information display system, so as to drive the flexible display loop 20 to move in a reverse direction, for example, from right to left as indicated by another arrow. There may be a plurality of writeheads 22 to contact with sections of the flexible display loop 20. As a result, the sections of the flexible display loop 20 that move past the writeheads 22 may be written or re-written with advertising texts or images. And the user may be able to view a variety of advertisements displayed in the sections of the flexible display loop 20 moving towards him or her like a scrolling marquee.

Figure 5:
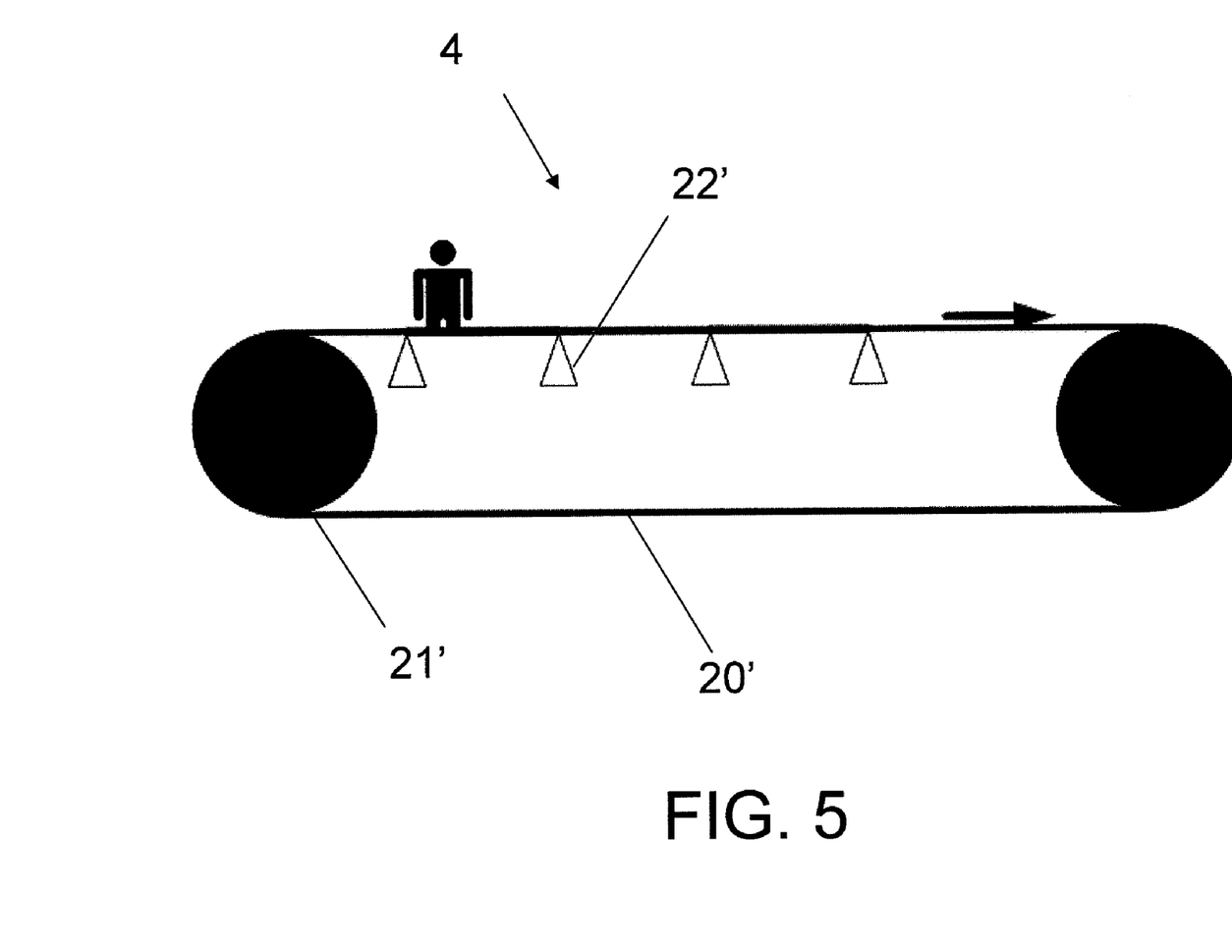
FIG. 5 is a cross-sectional view of an escalator system in accordance with a fourth embodiment of the present invention.

The fourth embodiment is described with reference to the escalator system 4 illustrated in FIG. 5. In the escalator system 4, there is provided a driving mechanism 21', a flexible display loop 20' traveling in a closed loop about the driving mechanism 21', and a plurality of writeheads 22' arranged to make contacts with sections of the flexible display loop 20'. Specifically, the flexible display loop 20' may be formed as part of the escalator handrail or serve as a loop of escalator handrail. Since the flexible display loop 20' may be set to move at the same speed as the step belt of the escalator system 4, the advertisement displayed in the bistable display loop 20' may seem relatively stationary to the user. There may be a plurality of writeheads 22', in this case four writeheads 22' to contact with sections of the flexible display loop 20'. Each of the writeheads 22' may be responsible for writing one quarter of the entire advertisement. Alternatively, the same advertisement may be written repeatedly using the four writeheads 22' distributed on the flexible display loop 20', so that the user may be able to read the advertisement in a quarter of time required for the entire escalator ride. As a result, the sections of the flexible display loop 20' that move past the writeheads 22' may be written or rewritten with various groups of advertisements. Therefore, the user may be given a sufficient amount of time during the escalator ride to view groups of advertisements displayed in a stretch of flexible display loop 20'.

Figure 6:
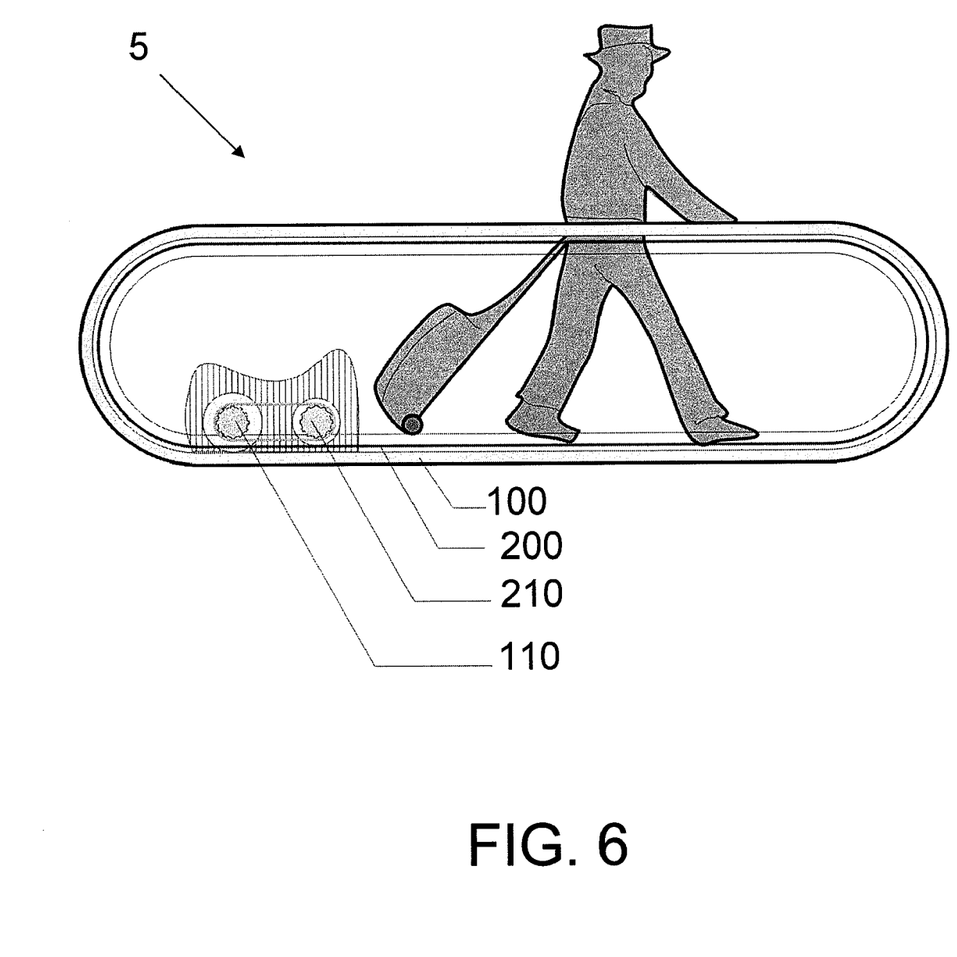
FIG. 6 is a cross-sectional view of an escalator system in accordance with a fifth embodiment of the present invention.

FIG. 6 is a cross-sectional view of an escalator system 5 in accordance with a fifth embodiment of the present invention. Referring to FIG. 6, the escalator system 5 may include an information display system and be applicable to convey passengers in the areas such as airports, ports or terminals. The escalator system 5 may further include a transparent handrail loop 100 driven by a main driving mechanism 110 to travel concordantly with the step belt (not shown) of the escalator system 5. As for the information display system, a flexible display loop 200 may be disposed below the transparent handrail loop 100. The flexible display loop 200 is driven by a driving module 210 to move in such a way that a section of the flexible display loop 200 may be written with texts or images by a writehead or electrode built within the driving module 210 of the information display system. As a result, when passengers travel on the step belt of the escalator system 5, they may view at their discretions the displayed advertisement or public notice in the flexible display loop 200 through the transparent handrail loop 100. The flexible display loop 200 may be driven to move relative to the transparent handrail loop 100 to result various advertising or broadcasting effects desired. For example, both the transparent handrail loop 100 and flexible display loop 200 may be driven to move in the same or opposite directions, at the same or different speeds.

According to other examples, the information display system may also be applicable to implement with other goods transporting systems which include but are not limited to automated conveyer belt through which updated packing or processing instructions or work reminders may be broadcasted or presented to people working in the factory areas. Also, the luggage conveyer belt in airports or terminals may also be equipped, assembled or built with the information display system of the present invention to display the flight or transportation details, public notices or announcements to passengers moving or standing near or onto the luggage conveyer belt.

Summarizing from the above, the present invention provides an information display system for passenger conveying device which may have a minimal requirement for electronics and power, yet may be capable of efficiently providing advertising effects to the public. The information display system which includes a display driving mechanism, a flexible display loop disposed on the display driving mechanism, and an image forming module that contacts with at least an area of the flexible display loop may be built within the passenger conveying device or included as a part of the passenger conveying device and operates without altering driving mechanism of the passenger conveying device. Thus, the present invention also provides passenger conveying devices, escalators and automated transport devices including the above-described information display system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An information display system comprising:
   a driving mechanism;
   a flexible display loop driven by the driving mechanism to travel in a closed loop, wherein the flexible display loop comprises a bistable medium; and
   an image forming module configured to write a formed image on any portion of the flexible display loop.

2. The information display system according to claim 1, further comprising a side panel, wherein the flexible display loop is disposed over the side panel.

3. The information display system according to claim 1, further comprising a handrail loop, wherein the flexible display loop is disposed on the handrail loop.

4. The information display system according to claim 3, wherein the handrail loop comprises a transparent handrail loop.

5. The information display system according to claim 4, wherein the flexible display loop is disposed below the transparent handrail loop.

6. The information display system according to claim 1, wherein the image forming module comprises at least one writehead arranged in electrical contact with a section of the flexible display loop.

7. The information display system according to claim 6, wherein the at least one writehead comprises a plurality of writeheads arranged in electrical contact with sections of the flexible display loop.

8. The information display system according to claim 1, wherein the image forming module comprises at least one writehead arranged to conduct light to a section of the flexible display loop.

9. The information display system according to claim 8, wherein the image forming module comprises a plurality of writeheads arranged to conduct light to sections of the flexible display loop.

10. A conveying device comprising:
    a conveyer belt;
    a side panel disposed at a region lateral to the conveyer belt; and
    an information display system configured to display information on the side panel, the information display system comprising:
      a driving mechanism;
      a flexible display loop driven by the driving mechanism to travel in a closed loop on the panel; and
      an image forming module configured to provide information to at least a section of the flexible display loop.

11. The conveying device according to claim 10, wherein the flexible display loop is disposed over the side panel.

12. The conveying device according to claim 10 further comprising a handrail loop around the side panel.

13. The conveying device according to claim 10, wherein the image forming module comprises at least one writehead arranged in electrical contact with a section of the flexible display loop.

14. The conveying device according to claim 13, wherein the at least one writehead comprises a plurality of writeheads arranged in electrical contact with sections of the flexible display loop.

15. The conveying device according to claim 10, wherein the image forming module comprises at least one writehead arranged to conduct light to a section of the flexible display loop.

16. The conveying device according to claim 15, wherein the at least one writehead comprises a plurality of writeheads arranged to conduct light to sections of the flexible display loop.

17. The conveying device according to claim 10, wherein the flexible display loop comprises at least one of a bistable display, electrophoretic display or cholesteric liquid crystal display.

18. The conveying device according to claim 10, wherein the flexible display loop moves in a same direction as the conveyer belt.

19. The conveying device according to claim 10, wherein the flexible display loop moves in an opposite direction from the conveyer belt.

20. An escalator system comprising:
a step belt including a plurality of steps;
a side panel disposed at a region defined by the step belt;
a handrail loop around the side panel; and
an information display system comprising:
a driving mechanism;
a flexible display loop driven by the driving mechanism to travel in a closed loop; and
an image forming module configured to provide information to at least a section of the flexible display loop.

21. The escalator system according to claim 20, wherein the flexible display loop is disposed over the side panel.

22. The escalator system according to claim 20, wherein the flexible display loop is disposed on the handrail loop.

23. The escalator system according to claim 22, wherein the loop of handrail comprises a transparent handrail loop.

24. The escalator system according to claim 23, wherein the flexible display loop is disposed below the transparent handrail loop.

25. The escalator system according to claim 20, wherein the image forming module comprises at least one writehead arranged in electrical contact with a section of the flexible display loop.

26. The escalator system according to claim 25, wherein the at least one writehead comprises a plurality of writeheads arranged in electrical contact with sections of the flexible display loop.

27. The escalator system according to claim 20, wherein the image forming module comprises at least one writehead arranged to conduct light to a section of the flexible display loop.

28. The escalator system according to claim 27, wherein the at least one writehead comprises a plurality of writeheads arranged to conduct light to sections of the flexible display loop.

29. The escalator system according to claim 20, wherein the flexible display loop moves in a same direction as the handrail loop.

30. The escalator system according to claim 20, wherein the flexible display loop moves in an opposite direction from the handrail loop.

* * * * *